United States Patent
Duan

(10) Patent No.: US 10,410,573 B2
(45) Date of Patent: Sep. 10, 2019

(54) METHOD FOR DISPLAY CONTROL, DISPLAY CONTROL DEVICE AND DISPLAY CONTROL SYSTEM

(71) Applicant: BOE Technology Group Co., Ltd., Beijing (CN)

(72) Inventor: Ran Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/574,428

(22) PCT Filed: Apr. 18, 2017

(86) PCT No.: PCT/CN2017/080910
§ 371 (c)(1),
(2) Date: Nov. 15, 2017

(87) PCT Pub. No.: WO2017/181937
PCT Pub. Date: Oct. 26, 2017

(65) Prior Publication Data
US 2018/0293932 A1    Oct. 11, 2018

(30) Foreign Application Priority Data
Apr. 19, 2016   (CN) .......................... 2016 1 0245268

(51) Int. Cl.
*G06F 3/14* (2006.01)
*G09G 3/20* (2006.01)
(Continued)

(52) U.S. Cl.
CPC .............. *G09G 3/2096* (2013.01); *G06F 3/14* (2013.01); *G09G 3/20* (2013.01); *G09G 3/3611* (2013.01);
(Continued)

(58) Field of Classification Search
None
See application file for complete search history.

(56) References Cited

U.S. PATENT DOCUMENTS 8,872,733 B2    10/2014  Yoshimura
2006/0044215 A1  3/2006  Brody et al.
(Continued)

FOREIGN PATENT DOCUMENTS

CN    101930709 A    12/2010
CN    102750909 A    10/2012
(Continued)

OTHER PUBLICATIONS

International Search Report from International Patent Application No. PCT/CN2017/080910, dated Jul. 31, 2017, 13 pages.
(Continued)

*Primary Examiner* — Kyle Zhai
(74) *Attorney, Agent, or Firm* — Westman, Champlin & Koehler, P.A.

(57) ABSTRACT

The disclosure provides a method for display control, a display control device and a display control system. The method includes: dividing a single display screen into display regions which are arranged into an M×N array, where M is an integer larger than 1 and N is an integer larger than 1; and controlling respective display regions to display corresponding images, such that the images displayed by all the display regions are allowed to be spliced together to present a picture to be displayed by the display screen.

17 Claims, 8 Drawing Sheets

--- dividing a single display screen into display regions which are arranged into an M×N array, where M and N are each an integer larger than 1 — S101 controlling respective display regions to display corresponding images, such that the images displayed by all the display regions are allowed to be spliced together to present a picture to be displayed by the display screen — S102

(51) Int. Cl.
  *G09G 5/14* (2006.01)
  *G09G 5/391* (2006.01)
  *G09G 3/36* (2006.01)
(52) U.S. Cl.
  CPC ............ *G09G 5/14* (2013.01); *G09G 5/391* (2013.01); *G09G 2300/026* (2013.01); *G09G 2310/0232* (2013.01); *G09G 2310/08* (2013.01); *G09G 2360/06* (2013.01)

(56) References Cited

U.S. PATENT DOCUMENTS

2007/0127564 A1   6/2007   Li
2015/0348250 A1   12/2015  Nakai
2018/0045970 A1*  2/2018   Shinohara ............... G02B 6/00

FOREIGN PATENT DOCUMENTS

| CN | 103269416 A | 8/2013 |
| CN | 103581601 A | 2/2014 |
| CN | 104049812 A | 9/2014 |
| CN | 104104888 A | 10/2014 |
| CN | 104361837 A | 2/2015 |
| CN | 104657045 A | 5/2015 |
| CN | 105451062 A | 3/2016 |
| CN | 105867867 A | 8/2016 |

OTHER PUBLICATIONS

First Office Action, including Search Report, for Chinese Patent Application No. 201610245268.0, dated May 18, 2018, 12 pages.
Second Office Action, including Search Report, for Chinese Patent Application No. 201610245268.0, dated Oct. 10, 2018, 9 pages.

* cited by examiner

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

Fig. 10

METHOD FOR DISPLAY CONTROL, DISPLAY CONTROL DEVICE AND DISPLAY CONTROL SYSTEM

CROSS-REFERENCE TO RELATED APPLICATION

The present disclosure is a Section 371 National Stage Application of International Application No. PCT/CN2017/080910, filed Apr. 18, 2017, which has not yet published, and claims the benefit of Chinese Patent Application Invention No. 201610245268.0 filed on Apr. 19, 2016 in the State Intellectual Property Office of China, the contents of which are incorporated herein by reference in their entirety.

BACKGROUND OF THE DISCLOSURE

Field of the Disclosure

Embodiments of the present disclosure generally relate to the field of display technologies, and in particular, to a method for display control, a display control device, and a display control system.

Description of the Related Art

With a development of an ultra-high definition display system, a resolution of a liquid crystal panel becomes much higher; and correspondingly, a requirement on signal processing capability of the ultra-high definition display system also becomes greater.

At present, there is no ASIC chip designed for the latest ultra-high definition display screen; and as to a requirement of processing of massive volume of data, only an FPGA may be qualified. However, any FPGA qualified for processing such a massive volume of data may be expensive in terms of cost thereof, and thus is disadvantageous to mass production.

SUMMARY OF THE DISCLOSURE

The present disclosure has been made to overcome or alleviate at least one of the above mentioned and other disadvantages and/or shortcomings in the prior arts.

An object of the disclosure is to provide a method for display control, a display control device and a display control system, so as to implement signal processing of a display screen having an ultra-high definition resolution by adopting a plurality of chips of relatively low cost to cooperate with one another, resulting in a decreased cost and facilitating mass production thereof.

According to an aspect of the disclosure, there is provided a method for display control, comprising steps of:

dividing a single display screen into display regions which are arranged into an M×N array, where M is an integer larger than 1 and N is an integer larger than 1; and controlling respective display regions to display corresponding images, such that the images displayed by all the display regions are allowed to be spliced together to present a picture to be displayed by the display screen.

In an embodiment, each of the display regions is controlled by one processing unit to display the image.

In an embodiment, each of the display regions comprises an edge region which is required to perform edge information interaction with a display region adjacent thereto, with scanning data for each of the display regions being stored in a processing unit corresponding to the display region; and for each of the display regions, the step of controlling respective display regions to display corresponding images comprises:

obtaining primary display data of the display region from the processing unit corresponding to the display region, the primary display data comprising portions of the scanning data of the display region except display data of the edge region;

receiving edge interaction data from a processing unit corresponding to the adjacent display region; and performing data processing on both the primary display data and the edge interaction data so as to obtain current resultant display data of the display region.

In an embodiment, the step of controlling respective display regions to display corresponding images further comprises sub-steps of:

defining every four display regions which are adjacent to one another laterally and vertically within the display screen as a display group, the four display regions of each display group including a primary display region, a first secondary display region, a second secondary display region and a third secondary display region of the display group being sequentially arranged depending on a sequence of data scanning;

providing processing units each corresponding to one of the M×N display regions, each of the processing units storing therein scanning data for a corresponding display region, one of the processing units in each display group which is provided corresponding to the primary display region of the display group being a primary processing unit for the display group, while other ones of the processing units in the display group which are provided corresponding to the secondary display regions of the display group being secondary processing units for the display group;

controlling the respective processing units to operate, such that the respective processing units acquire sequentially the primary display data of corresponding display regions while the data scanning is performed in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group;

controlling each of the processing units to acquire the current resultant display data of the corresponding display region by using a preset filtering algorithm and a preset image processing algorithm which are stored in the processing unit, depending on the primary display data of the corresponding display region which are currently acquired already, and on the edge interaction data which are sent from corresponding secondary processing units for a specific display group and are currently received already when the processing unit itself functions as a primary processing unit corresponding to the specific display group; and determining whether or not a preset synchronous output condition is met, and if yes, controlling the respective processing units to synchronously control, according to the current resultant display data of the corresponding display regions which have been acquired, the corresponding display regions to display the corresponding images, such that the images displayed by all of the display regions are allowed to be spliced together to present the picture to be displayed by the display screen.

In an embodiment, each of the display regions of the display screen comprises pixels which are arranged in an in a $n1 \times m1$ array, where n1 is an integer larger than 2 and m1 is an integer larger than 2, the primary display data of the primary display region of each display group includes display data from the $a^{th}$ row, the $b^{th}$ column to the $n1^{th}$ row, the $m1^{th}$ column, where a is equal to n/2 while b is equal to m/2, n and m represent the number of rows and the number of columns respectively, of a filter kernel, which is used in the preset filtering algorithm stored in each of the processing units, and n is less than n1 while m is less than m1;

a first processing unit, a second processing unit and a third processing unit of each display group send first edge interaction data, second edge interaction data and third edge interaction data to the primary processing unit corresponding to the display group, respectively;

the first edge interaction data are display data from the first row, the first column to the $n1^{th}$ row, the $2b^{th}$ column of the first secondary display region of each display region, the second edge interaction data are display data from the first row, the first column to the $2a^{th}$ row, the $m1^{th}$ column of the second secondary display region of each display region, and the third edge interaction data are display data from the first row, the first column to the $2a^{th}$ row, the $2b^{th}$ column of the third secondary display region of each display region, and entire resultant display data of each display region comprise display data in a $n1 \times m1$ array.

In an embodiment, the sub-step S24 comprises:

controlling each of the processing units to acquire current edge display data when the processing unit itself functions as a primary processing unit by the preset filtering algorithm, according to the edge interaction data which are sent from corresponding secondary processing units for a specific display group and are currently received already when the processing unit itself functions as a primary processing unit corresponding to the specific display group, and according to the primary display data of the corresponding display region which are currently acquired already; and controlling each of the processing units to acquire the current resultant display data of the corresponding display region by the preset image processing algorithm, according to the current edge display data of the processing unit when the processing unit itself functions as a primary processing unit and according to the primary display data of the corresponding display region which are currently acquired already.

In an embodiment, the edge display data of the primary processing unit corresponding to each display group comprise first edge display data, second edge display data, and third edge display data;

the first edge display data are edge display data which are positioned from the $a^{th}$ row, the first column to the $n1^{th}$ row, the $b^{th}$ column of the first secondary display region and are acquired by the primary processing unit corresponding to each display group by using the preset filtering algorithm;

the second edge display data are edge display data which are positioned from the first row, the $b^{th}$ column to the $a^{th}$ row, the $m1^{th}$ column of the second secondary display region and are acquired by the primary processing unit corresponding to each display group by using the preset filtering algorithm; and the third edge display data are edge display data which are positioned from the first row, the first column to the $a^{th}$ row, the $b^{th}$ column of the third secondary display region and are acquired by the primary processing unit corresponding to each display group by using the preset filtering algorithm.

In an embodiment, the determining whether or not a preset synchronous output condition is met comprises:

determining whether or not resultant display data of a first preset number of rows are acquired by the primary processing unit corresponding to each display group, and if yes, controlling the primary processing unit corresponding to the display group to send a synchronization request towards the secondary processing units corresponding to the display group, respectively; and determining whether or not synchronization responses sent by all of the secondary processing units corresponding to the display group are received by the primary processing unit corresponding to the display group, and if yes, determining that the preset synchronous output condition is met;

the synchronization response is sent by the secondary processing unit corresponding to the display group after the secondary processing unit corresponding to the display group has received the synchronization request sent by the primary processing unit corresponding to the display group and it is determined that the resultant display data of the first preset number of rows of the secondary processing unit have been saved by the secondary processing unit itself.

In an embodiment, the processing unit is implemented by a SOC/FPGA board or chip.

According to another aspect of the disclosure, there is provided a display control device, comprising:

a division unit configured to divide a single display screen into non-spliced display regions which are arranged into an $M \times N$ array, where M is an integer larger than 1 and N is an integer larger than 1; and a control unit configured to control respective display regions to display corresponding images, such that the images displayed by all the display regions are allowed to be spliced together to present a picture to be displayed by the display screen.

In an embodiment, the display control device further comprises processing units, each of which is configured to control one of the display regions to display the image.

In an embodiment, each of the display regions comprises an edge region which is required to perform edge information interaction with a display region adjacent thereto, with scanning data for each of the display regions being stored in a processing unit corresponding to the display region; and the control unit is configured to:

obtain primary display data of the display region from the processing unit corresponding to the display region, the primary display data comprising portions of the scanning data of the display region except display data of the edge region;

receive edge interaction data from a processing unit corresponding to the adjacent display region; and perform data processing on both the primary display data and the edge interaction data so as to obtain current resultant display data of the display region.

In an embodiment, the control unit comprises:

a definition module, which is configured to define every four display regions which are adjacent to one another laterally and vertically within the display screen as a display group, the four display regions of each display group including a primary display region, a first secondary display region, a second secondary display region and a third secondary display region of the display group being sequentially arranged depending on a sequence of data scanning;

a setting module, which is configured to provide processing units each corresponding to one of the $M \times N$ display regions, each of the processing units storing therein scanning data for a corresponding display region, one of the processing units in each display group which is provided corresponding to the primary display region of the display group being a primary processing unit for the display group, while other ones of the processing units in the display group which are provided corresponding to the secondary display regions of the display group being secondary processing units for the display group;

a control module, which is configured to:

control the respective processing units to operate, such that the respective processing units acquire sequentially the primary display data of corresponding display regions while the data scanning is performed in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group; and control each of the processing units to acquire the current resultant display data of the corresponding display region by using a preset filtering algorithm and a preset image processing algorithm which are stored in the processing unit, depending on the primary display data of the corresponding display region which are currently acquired already, and on the edge interaction data which are sent from corresponding secondary processing units for a specific display group and are currently received already when the processing unit itself functions as a primary processing unit corresponding to the specific display group; and a determination module, which is configured to determine whether or not a preset synchronous output condition is met, and if yes, to send a trigger signal to the control module; and the control module is further configured to control the respective processing units to synchronously control, according to the current resultant display data of the corresponding display regions which have been acquired, the corresponding display regions to display the corresponding images, such that the images displayed by all of the display regions are allowed to be spliced together to present the picture to be displayed by the display screen.

In an embodiment, each of the display regions of the display screen comprises pixels which are arranged in an in a n1×m1 array, where n1 is an integer larger than 2 and m1 is an integer larger than 2, the primary display data of the primary display region of each display group includes display data from the $a^{th}$ row, the $b^{th}$ column to the $n1^{th}$ row, the $m1^{th}$ column m1, where a is equal to n/2 while b is equal to m/2, n and m represent the number of rows and the number of columns respectively, of a filter kernel, which is used in the preset filtering algorithm stored in each of the processing units, and n is less than n1 while m is less than m1;

a first processing unit, a second processing unit and a third processing unit of each display group send first edge interaction data, second edge interaction data and third edge interaction data to the primary processing unit corresponding to the display group, respectively;

the first edge interaction data are display data from the first row, the first column to the $n1^{th}$ row, the $2b^{th}$ column of the first secondary display region of each display region, the second edge interaction data are display data from the first row, the first column to the $2a^{th}$ row, the $m1^{th}$ column of the second secondary display region of each display region, and the third edge interaction data are display data from the first row, the first column to the $2a^{th}$ row, the $2b^{th}$ column of the third secondary display region of each display region; and entire resultant display data of each display region comprise display data in a n1×m1 array.

In an embodiment, the control module is further configured to:

control each of the processing units to acquire current edge display data when the processing unit itself functions as a primary processing unit by the preset filtering algorithm, according to the edge interaction data which are sent from corresponding secondary processing units for a specific display group and are currently received already when the processing unit itself functions as a primary processing unit corresponding to the specific display group, and according to the primary display data of the corresponding display region which are currently acquired already; and control each of the processing units to acquire the current resultant display data of the corresponding display region by the preset image processing algorithm, according to the current edge display data of the processing unit when the processing unit itself functions as a primary processing unit and according to the primary display data of the corresponding display region which are currently acquired already.

In an embodiment, the edge display data of the primary processing unit corresponding to each display group comprise first edge display data, second edge display data, and third edge display data;

the first edge display data are edge display data which are positioned from the $a^{th}$ row, the first column to the $n1^{th}$ row, the $b^{th}$ column of the first secondary display region and are acquired by the primary processing unit corresponding to each display group by using the preset filtering algorithm;

the second edge display data are edge display data which are positioned from the first row, the $b^{th}$ column to the $a^{th}$ row, the $m1^{th}$ column of the second secondary display region and are acquired by the primary processing unit corresponding to each display group by using the preset filtering algorithm; and the third edge display data are edge display data which are positioned from the first row, the first column to the $a^{th}$ row, the $b^{th}$ column of the third secondary display region and are acquired by the primary processing unit corresponding to each display group by using the preset filtering algorithm.

In an embodiment, the determination module is further configured to:

determine whether or not resultant display data of a first preset number of rows are acquired by the primary processing unit corresponding to each display group, and if yes, control the primary processing unit corresponding to the display group to send a synchronization request towards the secondary processing units corresponding to the display group, respectively; and determine whether or not synchronization responses sent by all of the secondary processing units corresponding to the display group are received by the primary processing unit corresponding to the display group, and if yes, determine that the preset synchronous output condition is met;

the synchronization response is sent by the secondary processing unit corresponding to the display group after the secondary processing unit corresponding to the display group has received the synchronization request sent by the primary processing unit corresponding to the display group and it is determined that the resultant display data of the first preset number of rows of the secondary processing unit have been saved by the secondary processing unit itself.

In an embodiment, the processing unit comprises a SOC/FPGA board or chip.

According to a further aspect of the disclosure, there is provided a display control system, comprising: a display screen, an output device for outputting display data, and the display control device according to any one of embodiments of the disclosure, and the output device, the display control device and the display screen are connected with one another sequentially.

BRIEF DESCRIPTION OF THE DRAWINGS

In order to illustrate technical solutions in embodiments of the disclosure or in the prior arts more clearly, a simple introduction to the drawings for depiction of embodiments of the disclosure and the prior arts will be set forth below. It is apparent that, only some exemplary embodiments are depicted as below by referring to the drawings, and other drawings may also be obtained on a basis of these drawings without paying any creative labor, as to those skilled in the art.

FIG. 10 illustrates a schematic view of primary display data and edge display data;

DETAILED DESCRIPTION OF PREFERRED EMBODIMENTS

Figure 1:
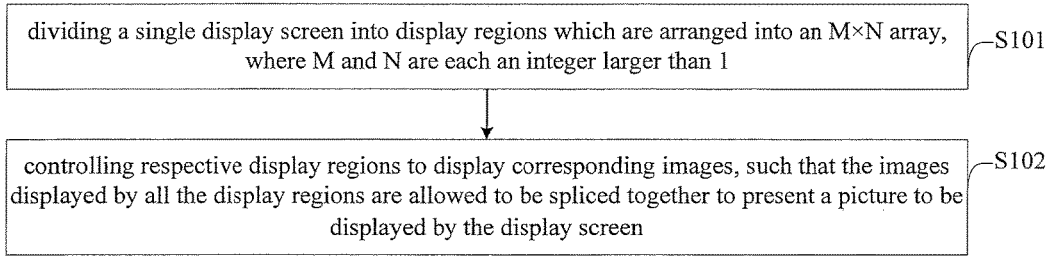
FIG. 1 illustrates a flow chart of a method for display control according to an embodiment of the disclosure.

In order to make objects, technical schemes and advantages of the present disclosure clearer, the disclosure will be described in further detail with reference to the accompanying drawings. Obviously, the described embodiments are merely a part of embodiments of the disclosure, rather than being all embodiments thereof. Based on the embodiments of the disclosure, all other embodiments arrived at by those ordinary skilled in the art without any inventive step will fall within the scope of the disclosure.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The display screen as mentioned in following embodiments may generally refer to a high-definition display screen. Certainly, the method for display control provided by the disclosure is also applicable to a display screen which is not of a high-definition resolution. It should be noted that, the method for display control in the disclosure is provided for a single or an integral display screen or display panel, rather than a spliced display screen or display panel.

FIG. 1 illustrates a flow chart of a method for display control according to an embodiment of the disclosure. Referring to FIG. 1, the method for display control as provided by the embodiment of the disclosure comprises following steps:

Step S101: dividing a single display screen into display regions which are arranged into an M×N array, where M is an integer larger than 1 and N is an integer larger than 1. It should be noticed that, though the display screen is divided into several display regions, such a division is only intended for a purpose of depiction, rather than a practical or physical division or splitting of the display screen. The display screen herein is essentially a single or an integral display screen or display panel, rather than a spliced display screen or display panel; in other words, it is not a display screen or display panel which are formed by a plurality of single or individual display screens or display units being spliced together or being connected with one another; and these display regions which are divided for the purpose of depiction are successive and continuous with one another, but is not physically spliced together or connected with one another.

Figure 2:
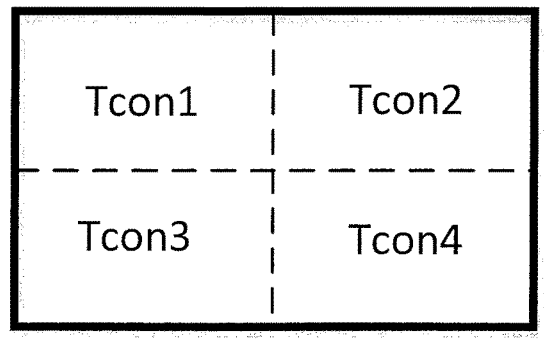
FIG. 2 illustrates a schematic view of a single display screen which is divided into four display regions.

In this step, taking a display system which has a resolution of 8K×4K for example, according to a division manner of a driver board of the screen, as illustrated in FIG. 2, a display screen which has a resolution of 7680×4320 may be divided into four display regions Tcon1~Tcon4, each of which has a resolution of 4K×2K (3840×2160). The division of the display screen in this step is due to a fact that, after such a division/dividing, an individual display control may be implemented on each of the display regions. By way of example, the display control for a single one of the plurality of display regions is implemented by one processing unit. As illustrated in FIG. 2, provided that each board has a capability of processing a resolution of 4K×2K, then, four board may be combined together to implement display control on the display screen which has a resolution of 8K×4K.

Step S102: controlling respective display regions to display corresponding images, such that the images displayed by all the display regions are allowed to be spliced together to present a picture to be displayed by the display screen.

In the method for display control as provided by the embodiment, the display screen is subject to a dividing process so as to obtain a plurality of display regions, and then the display control of images of respective display regions may be implemented respectively. Since after the dividing process, respective display data of each of the display regions may be relatively less as compared with display data of the entire display screen, then there may be a relative small volume of data to be processed upon the display control for each of the display regions; as such, a chip which is relatively low in cost thereof may be adopted for the display control for each of the display regions. However, in the prior art, upon the display control for the display screen, the display control is implemented for the whole display screen itself, resulting in a relatively large volume of data to be processed for the whole display screen, which may only be implemented by FPGA chip(s) having relative expensive cost, and thus is disadvantageous to mass production of the display screen. In contrast, in embodiments of the disclosure, a plurality of chips each of which is low in cost may be applied in combination with one another so as to implement the display control on an ultra-high definition display system, resulting in a decrease cost and in turn facilitating mass production. Furthermore, the method for display control as provided by the embodiment may meet requirements of the display control for a display screen of an even higher resolution by increasing the numbers of divided display regions and chips for processing.

In an embodiment of the disclosure, provided that there is a high-definition display screen having a relatively large display area, then, such a high-definition display screen is divided into display regions which are arranged into an M×N array.

In another embodiment of the disclosure, each of the plurality of display regions is provided with one processing unit, which may be implemented by a corresponding processing chip, e.g., SOC (System On chip). In other embodiments of the disclosure, depending on specific processing capability of the processing unit, one same processing unit may be provided for two or more display regions, and the single display screen may still be processed by the dividing process or subject to the display control on respective divided display regions, which is thus different from a case in which either the whole display screen or all display regions may be provided with only one processing unit.

Figure 3:
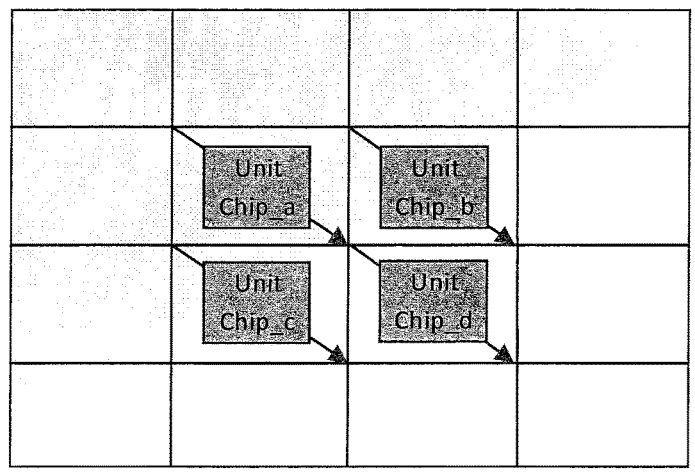
FIG. 3 illustrates a schematic view of a display screen which is divided into a plurality of display regions.

By way of example, as illustrated in FIG. 3, the display screen is divided into 16 display regions which are distributed in an array, in which four chips corresponding to four display regions thereof are demonstrated for illustration; in fact, all of the display regions may be provided with corresponding chips respectively.

Upon description hereinafter, a direction of data scanning from upper left to lower right is followed. Certainly, a specific direction of data scanning on the display screen may not be restricted to the scanning from upper left to lower right, it may alternatively be a scanning from lower right to upper left, or from upper right to lower left, or else from lower left to upper right.

Figure 4:
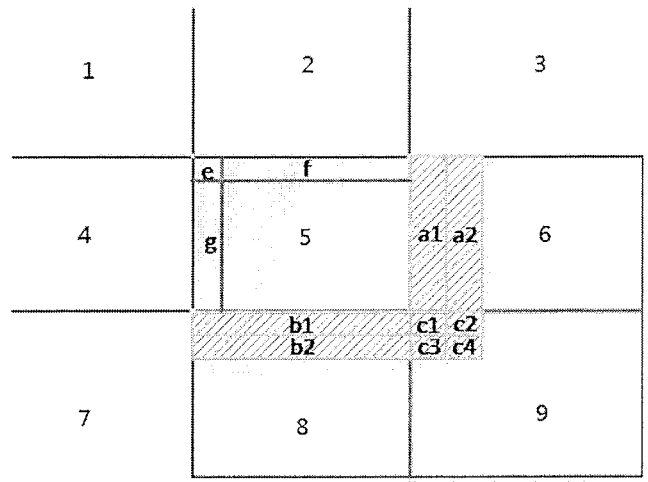
FIG. 4 illustrates a schematic view of an example of edge information interaction.

Taking four chips as illustrated in FIG. 3 for example, i.e., Unit Chip_a, Unit Chip_b, Unit Chip_c and Unit Chip_d, edge information for interaction thereamong (e.g., information of regions e, f, g) is illustrated in FIG. 4. Each of the chips may have not only a function of a primary processing unit MASTER, but also a function of a secondary processing unit SLAVE. Therefore, each of the chips may have both output port(s) for transmission of edge information, and input port(s). Provided that the direction of data scanning of the display screen is from upper left to lower right, then, as to the four chips as illustrated in FIG. 3, the chip at the upper left region functions as MASTER, and chips at a right region, a lower region and a lower right region relative to the MASTER function as SLAVE. Upon observation in the direction of data scanning, an initial pixel for each region unit is a point located at an upper left corner thereof, then, upon calculation of image information of an upper left region, it is impossible to get information of adjacent regions at an initial stage of displaying an image.

Figure 5:
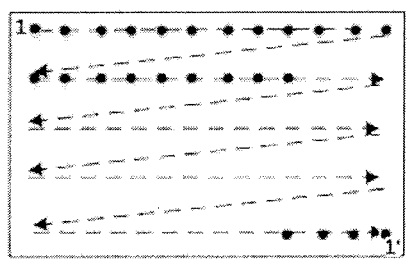
FIG. 5 illustrates a schematic view of data scanning in each display region.

FIG. 5 illustrates a schematic view of data scanning operation in a display region; as illustrated in FIG. 5, for each of the display regions, data are scanned progressively row by row. Referring to FIG. 5, a final pixel at a lower right corner (e.g., the pixel 1' as illustrated) may appear (i.e., may be scanned) after a period of a frame since a first pixel at an upper left corner (e.g., the pixel 1 as illustrated) appears.

In addition, for the M×N display regions of the display screen, the data scanning on respective display regions are performed simultaneously and independently. Therefore, if pixel values at both upper edge and left edge of a certain display region are to be compensated for, these pixel values may only be obtained once images at an upper left display region, an upper display region, and a left display region adjacent to the upper edge and left edge are scanned till the end of the frame. As such, image data of a frame of the display region as obtained already need only be saved, and the pixel values of upper edge and left edge may be calculated until receiving information of corresponding edge regions of images of the upper left display region, the upper display region and the left display region adjacent to the upper edge and left edge. Therefore, referring to FIG. 4, the information of the regions e, f, g, (i.e., upper edge and left edge of the display region 5) may only be calculated at an intermediate stage of the scanning. For example, the information of the region e can only be got immediately before end of the scanning of the display regions 1, 2, the information of the region f is can only be got immediately before end of the scanning of the display region 2, and the information of a portion of the region g can only be got immediately before end of the scanning of the display region 4. Then it is required that respective processing unit corresponding to each of the display regions should be provided with memory chip(s), (such as DDR and the like). For example, as to the display region 5, the processing unit corresponding thereto is required to be provided with memory chip(s), so that the scanning data information of the display region 5 except the regions e, f, g thereof is stored in the provided memory chip of the processing unit corresponding to the display region 5; and the display of the display data of the entire display region 5 is implemented till the information of the regions e, f, g is obtained. Therefore it can be seen that, by such a data processing, not only DDR of a relatively large size of memory should be provided outside the processing unit, but also a real-time display may not be realized (due to a relatively long waiting time), resulting in a relatively complex and less effective data processing.

Figure 6:
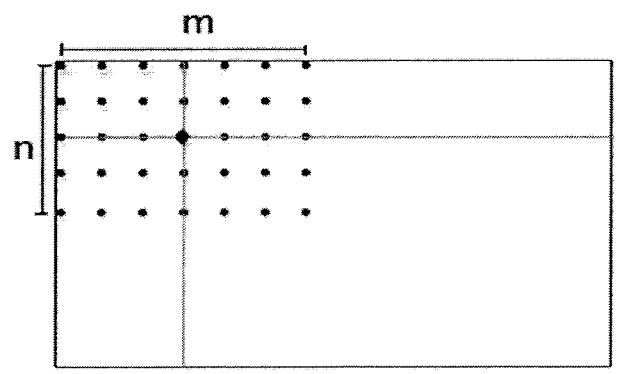
FIG. 6 illustrates a schematic view of influence of a filter kernel on edge information interaction.
Figure 7:
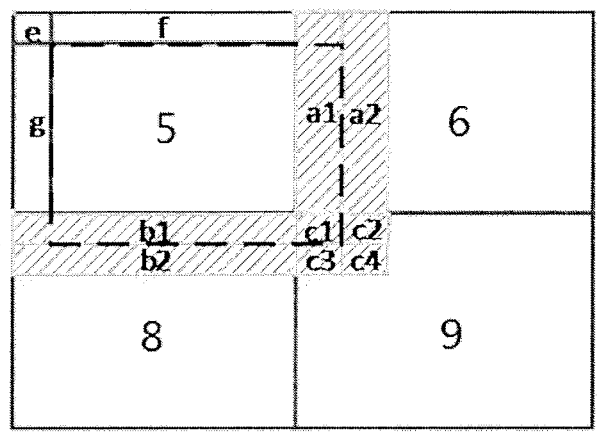
FIG. 7 illustrates a schematic view of another example of edge information interaction.
Figure 8:
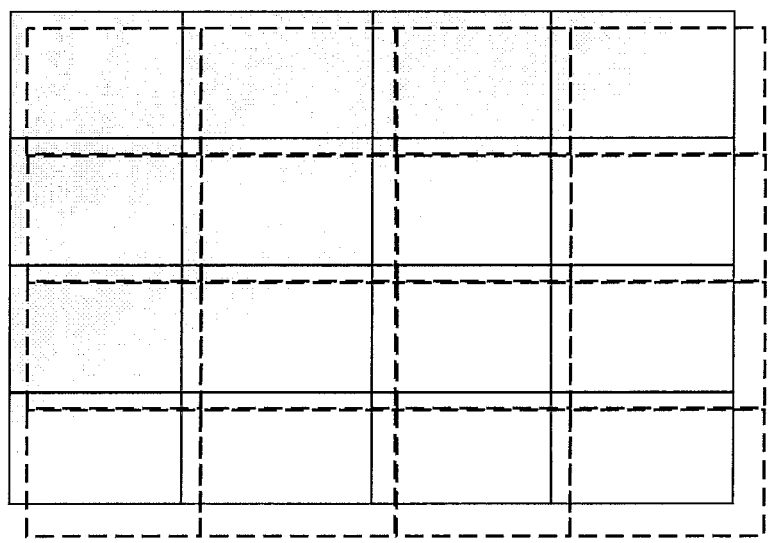
FIG. 8 illustrates a schematic view of a spliced display effect of various display regions.

In order to solve the problem, a new processing method is proposed by the embodiments of the disclosure, specifically as set forth hereinafter:

FIG. 6 shows a filter kernel in an m×n array, whose size is determined by a preset filtering algorithm stored in a respective processing unit corresponding to each display region. Referring to FIG. 6, embodiments of the disclosure provide a concept where: if there is no interaction of edge information between a current display region and other adjacent display regions, an output of a first pixel of the current display region may be initiated at a pixel point in the $(n/2)^{th}$ row and the $(m/2)^{th}$ column (i.e., the black point as illustrated). By way of example, referring to FIG. 7 (which is a partial enlarged view of FIG. 4), the data scanning of respective processing units may be initiated from a dashed box as illustrated in FIG. 7, and meanwhile, processing units corresponding to the right display region, the lower display region and the lower right display region (i.e., the display regions 6, 8, 9) adjacent to the display region 5, send edge information in a real time manner to the display region 5, through a communication way (e.g., I2C), and then such edge information is stored in the processing unit corresponding to the display region 5 (may be stored completely in an on-chip buffer due to a relatively small information content thereof). Therefore, real-time calculation and output operations may be implemented for the dashed box as illustrated in FIG. 7. In FIG. 8, what is illustrated by a dashed box is a picture which is formed by final splicing after outputs from respective processing units; and since a left edge and an upper edge of the picture which fail to be displayed in an overall area of the picture are edges of the picture, it may not exert a great impact on overall effect.

Figure 9:
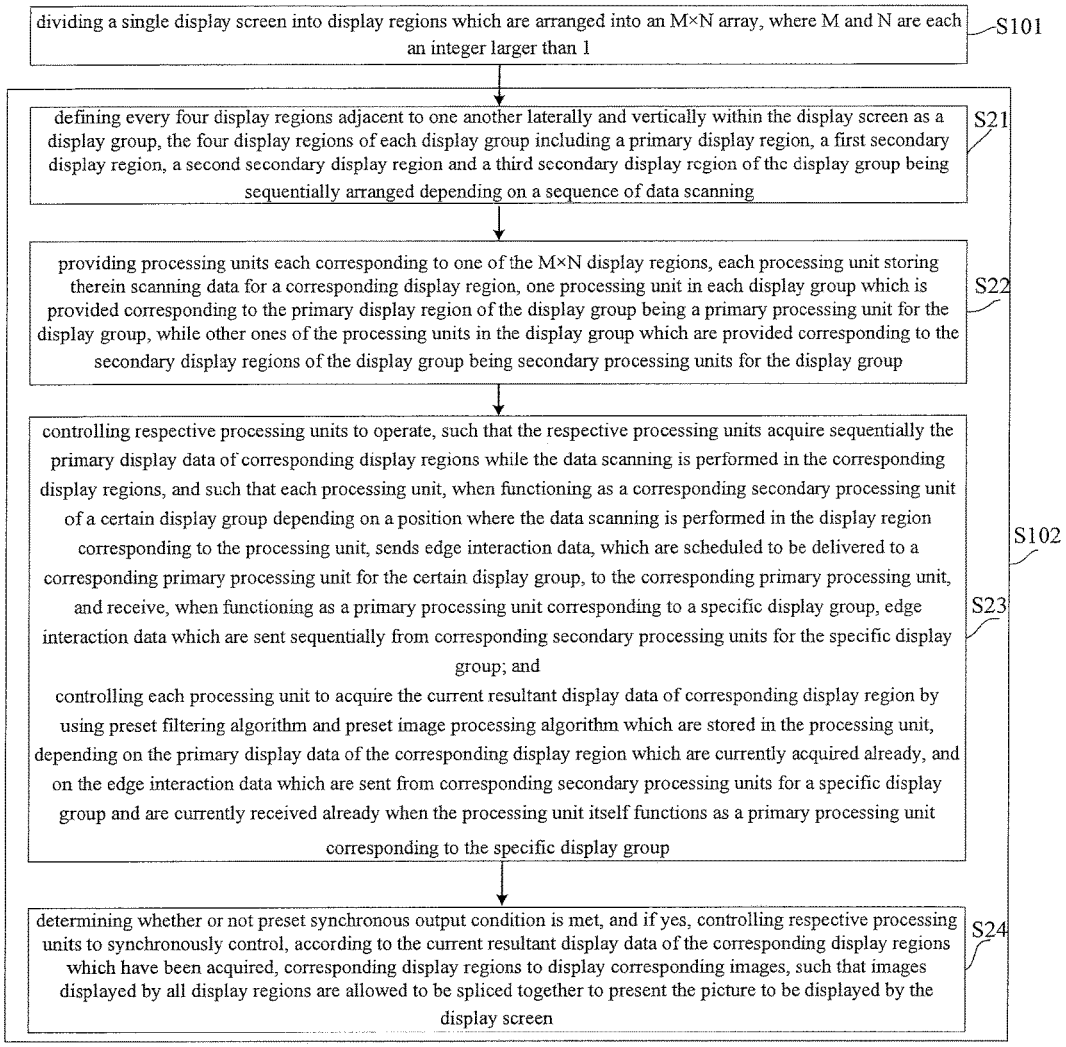
FIG. 9 illustrates a flow chart of a method for display control according to another embodiment of the disclosure.

Based on above analysis, a specific implementation of above step S102 is provided by another embodiment of the disclosure. In such an embodiment, as illustrated in FIG. 9, the step S102 further comprises following sub-steps:

Sub-step S21: defining every four display regions which are adjacent to one another laterally and vertically within the display screen as a display group, the four display regions of each display group including a primary display region, a first secondary display region, a second secondary display region and a third secondary display region of the display group being sequentially arranged depending on a sequence of data scanning.

Figure 10:
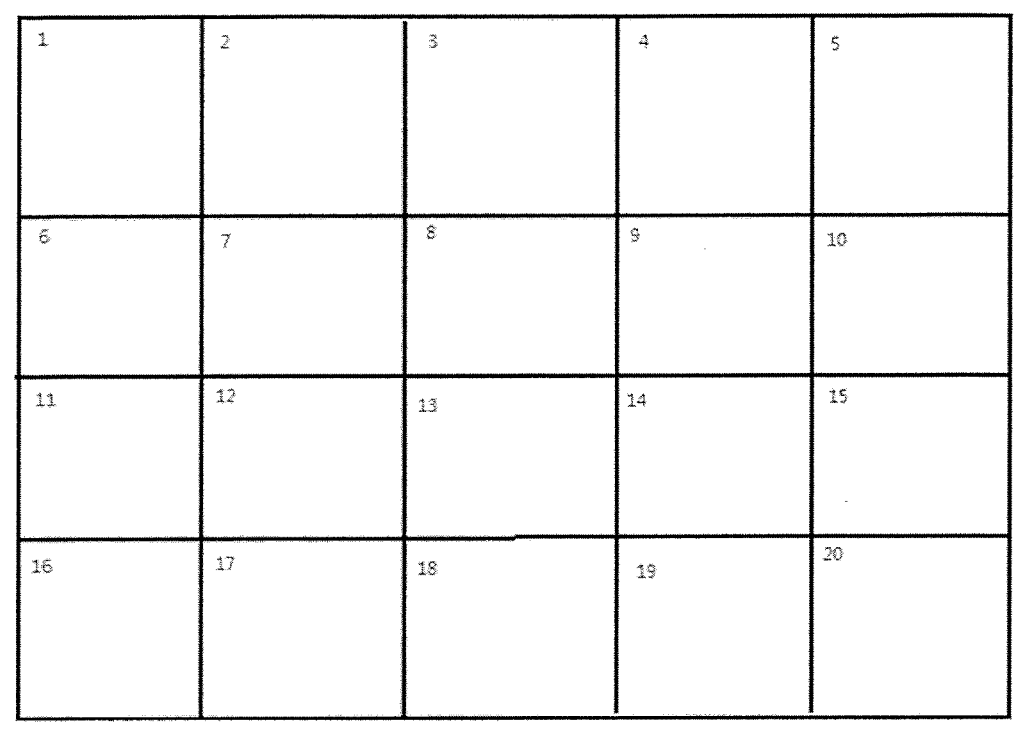

In this step, by way of example, the display screen is divided into display regions in a 4×5 array as illustrated in FIG. 10. Then, in this sub-step, every four display regions which are adjacent to one another laterally and vertically within the display screen are defined as a display group. Said "display group" herein is only a concept defined for facilitating subsequent depiction, rather than a real/physical display region. In this step, one same display region may exist in different display groups; in other words, one same display region may be contained in different display groups, due to a fact that any combination of every four display regions which are adjacent to one another laterally and vertically may be defined as a display group. By way of example, as illustrated in FIG. 10, numerals 1-20 refer to 20 display regions, wherein the numerals 1, 2, 6, 7 refer to one display group, the numerals 2, 3, 7, 8 refer to another display group, the numerals 3, 4, 8, 9 refer to still another display group, the numerals 4, 5, 9, 10 refer to yet another display group, the numerals 6, 7, 11, 12 refer to yet another display group, while the numerals 7, 8, 12, 13 refer to a further display group, and the like. And as to every four display regions in each display group, they are referred to as sequentially a primary display region, a first secondary display region, a second secondary display region and a third secondary display region of the display group, depending on a sequence of the data scanning. In other words, naming or division of primary display region and secondary display regions in each display group is related to the direction of data scanning.

For example, in an embodiment as illustrated in FIG. 10, as to the display group formed by numerals 1, 2, 6, 7, provided that the direction of data scanning of the display screen is from upper left to lower right, then the display region 1 functions as the primary display region of the display group, while numerals 2, 6, 7 refer to secondary display regions of the display regions respectively. By way of example, the numeral 2 refers to a first secondary display region, the numeral 6 refers to a second secondary display region and the numeral 7 refers to a third secondary display region.

Moreover, for example, similarly as to the display group formed by numerals 1, 2, 6, 7, provided that the direction of data scanning of the display screen is from lower right to upper left, then the display region 7 functions as the primary display region of the display group, while numerals 6, 2, 1 refer to secondary display regions of the display regions respectively. By way of example, the numeral 6 refers to a first secondary display region, the numeral 2 refers to a second secondary display region and the numeral 1 refers to a third secondary display region.

Furthermore, for example, similarly as to the display group formed by numerals 1, 2, 6, 7, provided that the direction of data scanning of the display screen is from upper right to lower left, then the display region 2 functions as the primary display region of the display group, while numerals 1, 7, 6 refer to secondary display regions of the display regions respectively. By way of example, the numeral 1 refers to a first secondary display region, the numeral 7 refers to a second secondary display region and the numeral 6 refers to a third secondary display region.

In addition, for example, similarly as to the display group formed by numerals 1, 2, 6, 7, provided that the direction of data scanning of the display screen is from lower left to upper right, then the display region 6 functions as the primary display region of the display group, while numerals 7, 1, 2 refer to secondary display regions of the display regions respectively. By way of example, the numeral 7 refers to a first secondary display region, the numeral 1 refers to a second secondary display region and the numeral 2 refers to a third secondary display region.

In above embodiments, row scanning is taken for example; certainly, as to column scanning, its operation principle or rule for determining the primary display region and the secondary display regions are essentially the same as the row scanning, and thus will not be repeated in detail herein.

Sub-step S22: providing processing units each corresponding to one of the M×N display regions, each of the processing units storing therein scanning data for a corresponding display region; and correspondingly, one of the processing units in each display group which is provided corresponding to the primary display region of the display group is a primary processing unit for the display group, while other ones of the processing units in the display group which are provided corresponding to the secondary display regions of the display group are secondary processing units for the display group.

In this sub-step, processing units may be provided, which are in one-to-one correspondence to the display regions, respectively. In an embodiment, the specific number of the processing units to be provided may be equal to that of the display regions divided in the display screen, one processing unit being provided corresponding to one display region. By way of example, as to the display screen illustrated in FIG. 10, there are 20 display regions in all, thus 20 processing units are provided, one processing unit being provided corresponding to one display region. Correspondingly, as to the primary display region of a certain display group, a processing unit corresponding to the primary display region refers to a primary processing unit for the display group (and will be represented by Master hereinafter); similarly, as to the secondary display regions of the display region, processing units corresponding to the secondary display regions refer to secondary processing units for the display group (and will be represented by Slave hereinafter). Since these processing units may only process display data of corresponding display regions, and correspondingly, the volume of data to be processed by the processing units is relatively lower, these processing units may be implemented by SOC/FPGA board or chips having a relatively lower cost.

Sub-step S23: controlling the respective processing units to operate, such that the respective processing units acquire sequentially the primary display data of corresponding display regions while the data scanning is performed (e.g., row by row) in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group; and controlling the respective processing units to acquire the current resultant display data of the corresponding display region sequentially (e.g., row by row) by using a preset filtering algorithm and a preset image processing algorithm which are stored in the processing units, depending on the primary display data of the corresponding display region which are currently acquired already, and on the edge interaction data which are sent from corresponding secondary processing units for a specific display group and are currently received already when the processing unit itself functions as a primary processing unit corresponding to the specific display group.

In an example, the sub-step S23 may comprise:

controlling the respective processing units to operate, such that the respective processing units acquire sequentially the primary display data of corresponding display regions while the data scanning is performed in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group.

Here, acquiring edge interaction data is intended to obtain edge display data by using the preset filtering algorithm. In an example, the preset filtering algorithm may use the filter kernel as illustrated in FIG. 6 to implement data processing. Exemplarily, specific operation principle of data processing with the filtering kernel is set forth in detail as below:

By way of example, referring to FIG. 6, if the pixel value at a position of the black point as illustrated is to be obtained, then, it will be determined collectively by pixel values around the black point; in other words, if the pixel value at the position of the black point in FIG. 6, then it will be determined collectively by pixel values in the m×n array as illustrated.

Similarly, as to FIG. 4 or FIG. 7, if it is desired to obtain the pixel values at a right edge of a region a1, then, the pixel values of a region a2 are to be required. Therefore, if it is desired to obtain edge display data of the display region 5 (e.g., display data of a portion of the region a1 falling within the dotted box, a portion of a region b1 falling within the dotted box, and a region c1), then not only display data of the regions a1, b1, c1 but also display data of the regions a2, b2, c2, c3 and c4 needs be obtained firstly. In other words, the display data of the regions a1, b1, c1, a2, b2, c2, c3 and c4 are the edge interaction data required by the display region 5.

After the edge interaction data are acquired by the display region 5, on a basis of the primary display data of the display region 5 (the display data of the display region with the regions e, f, g being subtracted therefrom), and the edge interaction data, the filter kernel as illustrated in FIG. 6 may be utilized to implement data processing so as to obtain the edge display data of the display region 5 (e.g., display data of the portion of the region a1 falling within the dotted box, the portion of a region b1 falling within the dotted box, and the region c1).

Furthermore, after the edge display data are acquired by the display region 5 (e.g., display data of the portion of the region a1 falling within the dotted box, the portion of a region b1 falling within the dotted box, and the region c1), the preset image processing algorithm (e.g., an image splicing algorithm) may be utilized to implement simple splicing of the primary display data of the display region 5 (with the display data of the regions e, f, g being subtracted therefrom) with the acquired edge display data, so as to obtain resultant display data within the whole dotted box as illustrated in FIG. 7.

Specific processing procedure of embodiments of the disclosure may be set forth in detail hereinafter, by referring to FIG. 4, FIG. 6 and FIG. 7 once again.

By way of example, still referring to FIG. 4, it is assumed that a certain display screen is divided into 9 display regions, each display region corresponding to one processing unit; and furthermore, each display region has a size of n1×m1 or comprises n1×m1 pixels, n1 being an integer larger than 2, m1 being an integer larger than 2; the primary display data of the primary display region of each display group includes display data from the $a^{th}$ row, the $b^{th}$ column to the $n1^{th}$ row, the $m1^{th}$ column, where a is equal to n/2 while b is equal to m/2, n and m represent the number of rows and the number of columns respectively, of a filter kernel, which is used in the preset filtering algorithm stored in each of the processing units, and n is less than n1 while m is less than m1. The filter kernel herein may be the filter kernel as illustrated in FIG. 6.

In this step, the operation of each processing unit is controlled such that, each of the processing units acquires sequentially the primary display data of the corresponding display regions (e.g., the display region 5), with the display data of the regions e, f, g being subtracted therefrom, while the data scanning is performed in the corresponding display region.

Besides, the operation of each processing unit is also controlled such that, each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group.

In an example, a first processing unit, a second processing unit and a third processing unit of each display group send first edge interaction data, second edge interaction data and third edge interaction data to the primary processing unit corresponding to the display group, respectively; for example, the first edge interaction data are display data from the first row, the first column to the $n1^{th}$ row, the $2b^{th}$ column of the first secondary display region of each display region, the second edge interaction data are display data from the first row, the first column to the $2a^{th}$ row, the $m1^{th}$ column of the second secondary display region of each display region, and the third edge interaction data are display data from the first row, the first column to the $2a^{th}$ row, the $2b^{th}$ column of the third secondary display region of each display region. By way of example, as to the display group formed by the display regions 5, 6, 8 and 9 (e.g., referring to FIGS. 4 and 7), it is assumed that the processing unit corresponding to the display region 5 is the primary processing unit, the processing unit corresponding to the display region 6 is the first secondary processing unit, the processing unit corresponding to the display region 8 is the second secondary processing unit, and the processing unit corresponding to the display region 9 is the third secondary processing unit.

Exemplarily, as shown in FIGS. 4 and 7, the first edge interaction data are the data of the regions a1 and a2, the second edge interaction data are the data of the regions b1 and b2; and the third interaction data are the data of the regions c1, c2, c3 and c4.

By way of example, as to the display region 6, with a change in the position where the data scanning is performed, the data belonging to the regions a1 and a2 are sent to the primary processing unit corresponding to the display region 5, successively and (since the data are scanned row by row, and thus it is impossible to send the data of the regions a1 and a2 to the display region 5 all at once). Similarly, this fact also applies to the display regions 8 and 9.

Certainly, the display region 5 not only receives the edge interaction data sent by the display regions 6, 8 and 9, but also sends edge interaction data, which are scheduled to be delivered to a corresponding primary processing unit for another display group when the display region 5 functions as a secondary display region in the another display group, to the corresponding primary processing unit of the another display group. By way of example, the display region 5 always functions as a secondary display region of the display group formed by the display regions 1, 2, 4 and 5, as a secondary display region of the display group formed by the display regions 2, 3, 5 and 6, and as a secondary display region of the display group formed by the display regions 4, 5, 7 and 8; as such, with a change in the position where the data scanning is performed, the display region 5 will send the desired edge interaction data to the corresponding primary processing units for respective display groups, respectively.

Each of the processing units are also controlled, while the edge interaction data are sent and received as above, to acquire sequentially (e.g., row by row) current edge display data when the processing unit itself functions as a primary processing unit by using the preset filtering algorithm, according to the primary display data of the corresponding display region which are currently acquired already and according to the edge interaction data which are sent from corresponding secondary processing units for a specific display group and are currently received already when the processing unit itself functions as a primary processing unit corresponding to the specific display group, and to acquire sequentially (e.g., by row by row) the current resultant display data of the corresponding display region by the preset image processing algorithm (e.g., image splicing algorithm) after the edge display data are received.

By way of example, referring to FIG. 7, each of the processing units are also controlled, while the edge interaction data are sent and received as above, to acquire sequentially, row by row, current edge display data when the processing unit itself functions as a primary processing unit by using the preset filtering algorithm, according to the primary display data of the corresponding display region which are currently acquired already and according to the edge interaction data which are sent from corresponding secondary processing units for a specific display group and are currently received already when the processing unit itself functions as a primary processing unit corresponding to the specific display group, and to acquire sequentially, row by row, the current resultant display data of the corresponding display region by the preset image processing algorithm (e.g., image splicing algorithm) after the edge display data are received. In an example, the entire result display data of each display region has a size of $n1 \times m1$.

Referring to FIG. 7, as to the display region 5, the processing unit corresponding thereto may acquire the edge interaction data (e.g., data in the portion of the region a1 falling within the dotted box, the portion of a region b1 falling within the dotted box and the region c1) from the primary display data of the display region 5 (with the display data of the regions e, f, g being subtracted therefrom) and the edge interaction data sent by the display regions 6, 8 and 9 (i.e., the display data of the regions a1, b1, c1, a2, b2, c2, c3 and c4) by the preset filtering algorithm stored in the processing unit corresponding to the display region 5, and then acquire sequentially the current resultant display data of the corresponding display region row by row, depending on the acquired edge interaction data (e.g., data in the portion of the region a1 falling within the dotted box, the portion of a region b1 falling within the dotted box and the region c1) and the acquired primary display data (with the display data of the regions e, f, g being subtracted therefrom), by using the preset image processing algorithm.

It should be noticed that here, the current result display data of the display region 5 will be calculated while acquisition (e.g., row by row) of the primary display data and acquisition (e.g., row by row) of the edge interaction data are implemented, rather than being calculated after acquisition of the primary display data and the display data in the regions a1, a2, b1, b2, c1, c2, c3 and c4 are completed. Specifically, the final resultant display zone for the display region 5 comprises the region as illustrated by the dotted region in FIG. 7. In other words, the current resultant display data of the corresponding display region 5 are acquired sequentially row by row, depending on the primary display data and the edge display data in the regions a1, a2, b1, b2, c1, c2, c3 and c4, by using the preset filtering algorithm and the preset image processing algorithm. In such an embodiment, with a progress in the data scanning, final resultant display data of the display region 5 thus acquired are display data within the dotted box.

In addition, since the edge interaction data sent from the display regions 6, 8, 9 towards the display region 5 may not be used immediately by the display region 5 after being received by the display region, then it is possible to cache the edge interaction data sent by the display regions 6, 8 and 9; and Such a cache may be implemented by an on-chip buffer due to a relatively small information content of such edge interaction data, without providing any memory chip externally.

Sub-step S24: determining whether or not a preset synchronous output condition is met, and if yes, controlling the respective processing units to synchronously control, according to the current resultant display data of the corresponding display regions which have been acquired, the corresponding display regions to display the corresponding images, such that the images displayed by all of the display regions are allowed to be spliced together to present the picture to be displayed by the display screen.

In this sub-step, determining whether or not a preset synchronous output condition is met may comprise determining whether or not a preset time interval may be met, for example, when the preset time interval may for example be 5 minutes, then each of the processing units is controlled to implement synchronous display control of respective images on corresponding display regions depending on the current resultant display data of the corresponding display regions which are have been acquired, such that the images displayed by all of the display regions can be spliced together to present an integral picture to be displayed by the display screen.

Or, determining whether or not a preset synchronous output condition is met may comprise determining whether or the resultant display data of a preset number of rows (e.g. 3 rows) has been processed by each of the processing units; if so, then each of the processing units is controlled to implement synchronous display control of respective images of the corresponding display region according to the current resultant display data of the corresponding plurality of display region which have been acquired, such that the images displayed by all of the display regions can be spliced together to present an integral picture to be displayed by the display screen.

The intention for determining whether or not a preset synchronous output condition is met is to avoid a problem of failure in forming a normal picture due to inconsistency of displayed images caused by inconsistency of processing speeds among various processing units.

For example, when each of the processing units has saved therein the resultant display data of a preset number of rows (e.g. 3 rows) and then all the processing units are controlled to implement respective display control on corresponding display regions respectively, each of the processing units has cached several rows of the resultant display data therein, thus even if there are a few deviations in the processing speeds of the processing units, simultaneous display control may essentially be implemented.

A specific implementation of controlling each of the processing units to acquire sequentially the current resultant display data of the corresponding display regions row by row as described in above sub-step S23 is provided in yet another embodiment of the disclosure.

In this embodiment, the sub-step S23 may comprise:

controlling each of the processing units to acquire current edge display data when the processing unit itself functions as a primary processing unit by using the preset filtering algorithm, according to the edge interaction data which are sent from corresponding secondary processing units for a specific display group and are currently received already when the processing unit itself functions as a primary processing unit corresponding to the specific display group, and according to the primary display data of the corresponding display region which are currently acquired already;

the edge display data of the primary processing unit corresponding to each display group comprise first edge display data, second edge display data, and third edge display data;

for example, the first edge display data are edge display data which are positioned from the $a^{th}$ row, the first column to the $n1^{th}$ row, the $b^{th}$ column of the first secondary display region and are acquired by the primary processing unit corresponding to each display group by using the preset filtering algorithm, that is, display data of a portion of the region a1 falling inside the dotted box as illustrated in FIG. 7;

the second edge display data are edge display data which are positioned from the first row, the $b^{th}$ column to the $a^{th}$ row, the $m1^{th}$ column of the second secondary display region and are acquired by the primary processing unit corresponding to each display group by using the preset filtering algorithm, that is, display data of a portion of the region b1 falling inside the dotted box as illustrated in FIG. 7;

the third edge display data are edge display data which are positioned from the first row, the first column to the $a^{th}$ row, the $b^{th}$ column of the third secondary display region and are acquired by the primary processing unit corresponding to each display group by using the preset filtering algorithm, that is, display data of the region c1 as illustrated in FIG. 7.

By way of example, as shown in FIG. 7, the primary processing unit corresponding to the display region 5 is used to acquire the edge display data of the portion of the region a1 falling within the dotted box, the portion of a region b1 falling within the dotted box and the region c1, on the basis of the primary display data of the display region 5 (with the display data of the regions e, f, g being subtracted therefrom) and the edge data in the regions a1, b1, c1, a2, b2, c2, c3 and c4, by using the preset filtering algorithm. In an example, the preset filtering algorithm is such an algorithm: referring to the filter kernel as illustrated in FIG. 6, its central value need be obtained from values of other points thereround. Therefore, the primary processing unit corresponding to the display region 5 may acquire the edge display data of the portion of the region a1 falling within the dotted box, the portion of a region b1 falling within the dotted box and the region c1, on the basis of the primary display data of the display region 5 (with the display data of the regions e, f, g being subtracted therefrom) and the edge display data in the regions a1, b1, c1, a2, b2, c2, c3 and c4, by using the preset filtering algorithm.

After the edge display data are acquired, the primary processing unit corresponding to the display region 5 may acquire the current resultant display data of the corresponding display region, by using the preset image processing algorithm (e.g., a simple image splicing algorithm), depending on both the acquired edge display data and the primary display data in the corresponding display region which are already acquired.

Referring to FIG. 7, after the primary processing unit corresponding to the display region 5 acquires the primary display data of the display region 5 (with the display data of the regions e, f, g being subtracted therefrom) and the edge interaction data therearound (the edge interaction data of the portion of the region a1 falling within the dotted bordered box, the portion of a region b1 falling within the dotted bordered box and the region c1), since these data are image data which are continuous and uninterrupted/intermittent, then, the current result display data of the display region 5 may be acquired by a simple image splicing algorithm.

It should be noticed that, no matter which of the edge display data or the resultant display data are acquired, the acquisition is implemented row by row, i.e., the data processing is implemented while the data scanning is implemented, that is, there is no requirement for any excessive awaiting and delay time in the whole process In yet another embodiment of the disclosure, a specific implementation of above sub-step S24 is provided.

In this embodiment, the sub-step S24 may comprise:

determining whether or not resultant display data of a first preset number of rows are acquired by the primary processing unit corresponding to each display group, and if yes, controlling the primary processing unit corresponding to the display group to send a synchronization request towards the secondary processing units corresponding to the display group, respectively; and determining whether or not synchronization responses sent by all of the secondary processing units corresponding to the display group are received by the primary processing unit corresponding to the display group, and if yes, determining that the preset synchronous output condition is met;

wherein the synchronization response is sent by the secondary processing unit corresponding to the display group after the secondary processing unit corresponding to the display group has received the synchronization request sent by the primary processing unit corresponding to the display group and it is determined that the resultant display data of the first preset number of rows of the secondary processing unit have been saved by the secondary processing unit itself.

In this embodiment, when determining whether or not all processing units have cached resultant display data of a first preset number of rows have been cached, it may firstly determine whether or not the primary processing unit has acquired the result display data of the first preset number of rows; if so, the primary processing unit corresponding to each display group is controlled to send a synchronization request towards the secondary processing units corresponding to each display group, respectively, and then it is determined whether or not synchronization responses sent by all of the secondary processing units corresponding to the display group are received by the primary processing unit. If so, it is indicated that, each of the processing units has cached with the resultant display data of the first preset number of rows, thereby it is determined that the preset synchronous output condition is met.

Figure 11:
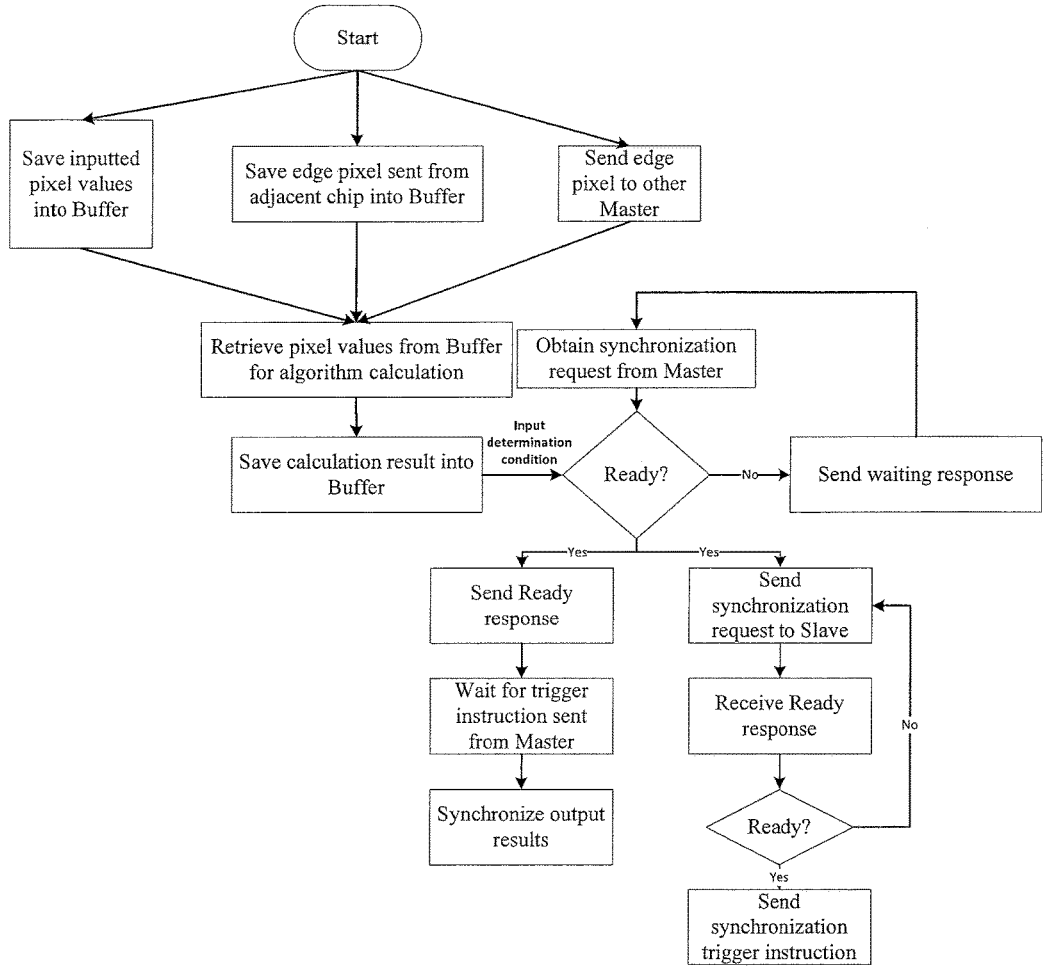
FIG. 11 illustrates a flow chart of a method for display control according to yet another embodiment of the disclosure.

Hereinafter, taking FIG. 11 for example, specific working processes of each of the processing units are set forth in detail. In an example, when be implemented, the processing unit may adopt or is implemented by a SOC/FPGA board or chip, for example, each of the processing units is corresponding to a SOC chip. When the SOC chip corresponding to each display region operations, as illustrated in FIG. 11, with initiation of the scanning, pixel values which are required to be used by the filter kernel may be saved into the on-chip buffer (Buffer) of the chip sequentially; meanwhile, depending on positions being scanned, the edge display data required to be sent when the chip functions as Slave (secondary processing unit) are organized and sent into corresponding Master (primary processing unit), while the edge display data sent from other Slave (secondary processing unit) are received and saved into the on-chip cache of the chip. With the scanning, when all on-chip buffer of the chips are saved with pixel values sufficient for calculation by the filter kernel (e.g., first two rows of data), then the chip begins to acquire portion of the resultant display data by using the preset image processing algorithm, and the acquired portion of the resultant display data are saved sequentially into respective on-chip buffers. When a certain number of rows of resultant display data have been acquired, it is determined that the synchronization condition is met.

Meanwhile, the chip corresponding to each display region keeps on receiving the synchronization requests sent from other Master all the time, and may send a Ready response in case that above condition (a certain number of rows of resultant display data has been acquired) is met, or may send a Wait response so as to acquire the synchronization requests from other Master once again. After the Ready response, the chip waits for a Trigger instruction sent by other Masters so as to synchronize output results. Meanwhile, the Master also sends its synchronization request to the Slave, and waits for and receives the response from the Slave; and once the Slave is ready, it then sends its Trigger instruction for the synchronization, which instruction needs be synchronous with the Trigger instruction(s) from other Master(s). Or otherwise, the synchronization request may be sent to the Slave all the time until a Ready response is transmitted by the Slave.

From above depictions, it may be known that, the method for control of the synchronization output as mentioned in the embodiment may implement control for synchronization display of various display regions.

Figure 12:
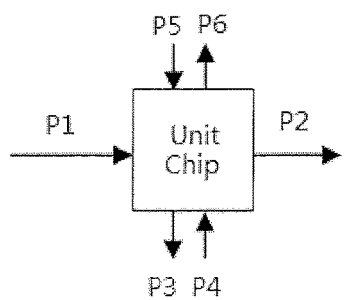
FIG. 12 illustrates a schematic view of output interfaces of a chip.

In an embodiment, referring to FIG. 12, the chip corresponding to each display region is provided with at least 6 interfaces, i.e., P1-P6, respectively, P1 being a video input interface (HDMI/DVI/DP/ . . . ), P2 being a video output interface (V-By-One/Lvds/ . . . ), P3-P4 being interaction interfaces of edge display data (one for input while the others for output), and P5-P6 being synchronous interaction interfaces (one for input while the other for output).

Figure 13:
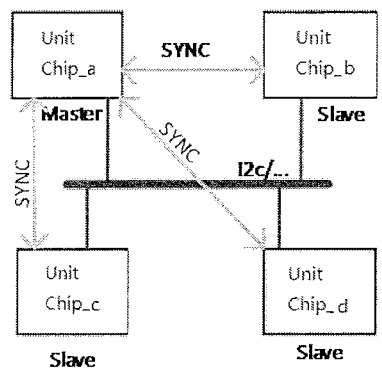
FIG. 13 illustrates a schematic view of information interactions among four chips of a display group.

As to the four chips corresponding to each display group, their data interaction ways may refer to FIG. 13.

From above depictions, it may be known that, in the method for display control in the embodiments of the disclosure, a division/dividing operation is performed on the display screen, such that the display control on a high-definition or a super-high definition display screen may be implemented by a plurality of processing units of relatively low cost (e.g., SOC/FPGA chips). The method for display control described in the embodiments of the disclosure has several advantages, in addition to reducing cost thereof and facilitating massive production, such as, shortening development period, and facilitating setup of standards due to universalization in solution.

Moreover, in the method for display control in the embodiments of the disclosure, when the edge interaction information of respective display regions are processed, a relative ingenious way of processing is adopted, so as to implement a real-time display control on the images displayed by the respective display regions; further, any additional memory chip which is otherwise provided externally may not be required by the processing units corresponding to the display regions, resulting in a reduced cost and a decreased complexity.

Figure 14:
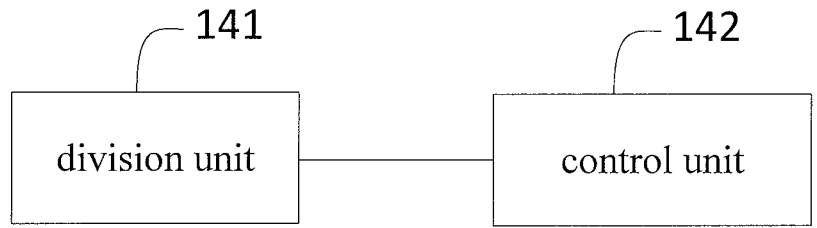
FIG. 14 is a schematic view showing arrangement of a display control device according to an embodiment of the disclosure.

A display control device is provided in another embodiment of the disclosure; referring to FIG. 14, the display control device comprises a division unit 141 and a control unit 142;

the division unit 141 is configured to divide a single display screen into non-spliced display regions which are arranged into an M×N array, where M is an integer larger than 1 and N is an integer larger than 1; and the control unit 142 is configured to control respective display regions to display corresponding images, such that the images displayed by all the display regions are allowed to be spliced together to present a picture to be displayed by the display screen.

The display control device of this embodiment may be used to implement the method for display control according to any of aforementioned embodiments, with a similar principle and technical effects which will not be repeated herein in detail any more.

Figure 15:
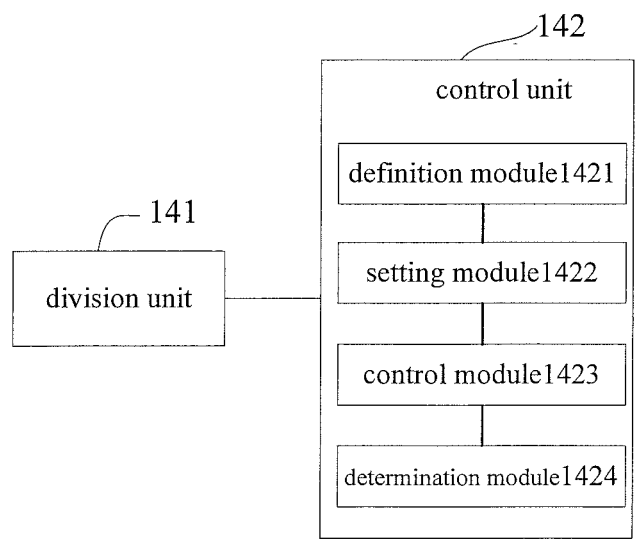
FIG. 15 is a schematic view showing arrangement a display control device according to another embodiment of the disclosure.

In still another embodiment of the disclosure, a specific implementation of above control unit is provided, referring to FIG. 15, the control unit 142 comprises: a definition module 1421, a setting module 1422, a control module 1423 and a determination module 1424;

the definition module 1421 is configured to define every four display regions which are adjacent to one another laterally and vertically within the display screen as a display group, the four display regions of each display group including a primary display region, a first secondary display region, a second secondary display region and a third secondary display region of the display group being sequentially arranged depending on a sequence of data scanning;

the setting module 1422 is configured to provide processing units each corresponding to one of the M×N display regions, each of the processing units storing therein scanning data for a corresponding display region, one of the processing units in each display group which is provided corresponding to the primary display region of the display group being a primary processing unit for the display group, while other ones of the processing units in the display group which are provided corresponding to the secondary display regions of the display group being secondary processing units for the display group;

the control module 1423 is configured to control the respective processing units to operate, such that the respective processing units acquire sequentially (e.g., row by row) the primary display data of corresponding display regions while the data scanning is performed in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group;

the control module 1423 is further configured to control each of the processing units to acquire the current resultant display data of the corresponding display region sequentially (e.g., row by row) by using a preset filtering algorithm and a preset image processing algorithm which are stored in the processing unit, based on the primary display data of the corresponding display region which are currently acquired already, and on the edge interaction data which are sent from corresponding secondary processing units for a specific display group and are currently received already when the processing unit itself functions as a primary processing unit corresponding to the specific display group;

the determination module 1424 is configured to configured to determine whether or not a preset synchronous output condition is met, and if yes, to send a trigger signal to the control module; and the control module 1423 is also configured to control the respective processing units to synchronously control, according to the current resultant display data of the corresponding display regions which have been acquired, the corresponding display regions to display the corresponding images, such that the images displayed by all of the display regions can be spliced together to present the picture to be displayed by the display screen.

In an example, each of the plurality of display regions of the display screen has a size of n1×m1, where n1 is an integer larger than 2 and m1 is an integer larger than 2; the primary display data of the primary display region of each display group includes display data from the $a^{th}$ row, the $b^{th}$ column to the $n1^{th}$ row, the $m1^{th}$ column m1, where a is equal to n/2 while b is equal to m/2, n and m represent the number of rows and the number of columns respectively, of a filter kernel, which is used in the preset filtering algorithm stored in each of the processing units, and n is less than n1 while m is less than m1;

in an example, a first processing unit, a second processing unit and a third processing unit of each display group send first edge interaction data, second edge interaction data and third edge interaction data to the primary processing unit corresponding to the display group, respectively;

in an example, the first edge interaction data are display data from the first row, the first column to the $n1^{th}$ row, the $2b^{th}$ column of the first secondary display region of each display region, the second edge interaction data are display data from the first row, the first column to the $2a^{th}$ row, the $m1^{th}$ column of the second secondary display region of each display region, and the third edge interaction data are display data from the first row, the first column to the $2a^{th}$ row, the $2b^{th}$ column of the third secondary display region of each display region, and in an example, the entire or complete resultant display data of each display region has a size of n1×m1.

In an embodiment, the control module 1423 may be configured to:

control each of the processing units to acquire current edge display data when the processing unit itself functions as a primary processing unit by the preset filtering algorithm, according to the edge interaction data which are sent from corresponding secondary processing units for a specific display group and are currently received already when the processing unit itself functions as a primary processing unit corresponding to the specific display group, and according to the primary display data of the corresponding display region which are currently acquired already; and control each of the processing units to acquire the current resultant display data of the corresponding display region by the preset image processing algorithm, according to the current edge display data of the processing unit when the processing unit itself functions as a primary processing unit and according to the primary display data of the corresponding display region which are currently acquired already.

In an example, the edge display data of the primary processing unit corresponding to each display group comprise first edge display data, second edge display data, and third edge display data;

the first edge display data are edge display data which are positioned from the $a^{th}$ row, the first column to the $n1^{th}$ row, the $b^{th}$ column of the first secondary display region and are acquired by the primary processing unit corresponding to each display group by using the preset filtering algorithm;

the second edge display data are edge display data which are positioned from the first row, the $b^{th}$ column to the $a^{th}$ row, the $m1^{th}$ column of the second secondary display region and are acquired by the primary processing unit corresponding to each display group by using the preset filtering algorithm; and the third edge display data are edge display data which are positioned from the first row, the first column to the $a^{th}$ row, the $b^{th}$ column of the third secondary display region and are acquired by the primary processing unit corresponding to each display group by using the preset filtering algorithm.

In an example, the determination module 1424 may be configured to:

determine whether or not resultant display data of a first preset number of rows are acquired by the primary processing unit corresponding to each display group, and if yes, control the primary processing unit corresponding to the display group to send a synchronization request towards the secondary processing units corresponding to the display group, respectively; and determine whether or not synchronization responses sent by all of the secondary processing units corresponding to the display group are received by the primary processing unit corresponding to the display group, and if yes, determine that the preset synchronous output condition is met;

the synchronization response is sent by the secondary processing unit corresponding to the display group after the secondary processing unit corresponding to the display group has received the synchronization request sent by the primary processing unit corresponding to the display group and it is determined that the resultant display data of the first preset number of rows of the secondary processing unit have been saved by the secondary processing unit itself.

The display control device described in the embodiments of the present disclosure may be used to implement the method for display control according to any of aforementioned embodiments, with a similar principle and technical effects which will not be repeated herein in detail any more.

Figure 16:
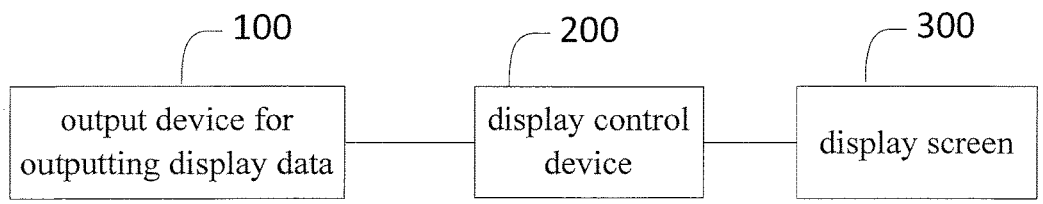
FIG. 16 is a schematic view showing arrangement of a display control system according to an embodiment of the disclosure.

A display control system is provided in a further embodiment of the disclosure; referring to FIG. 16, the display control system comprises: a display screen 300, an output device 100 for outputting display data, and the display control device according to any one of above embodiments, in an example, the output device 100 for outputting display data, the display control device 200 and the display screen 300 are connected with one another sequentially, the display control device 200 is used to process the scanning data which are output from the output device 100, so as to control the display of the display screen 300. The specific principle and effects may refer to the contents of above embodiments, without repeating herein in detail any more.

Figure 17:
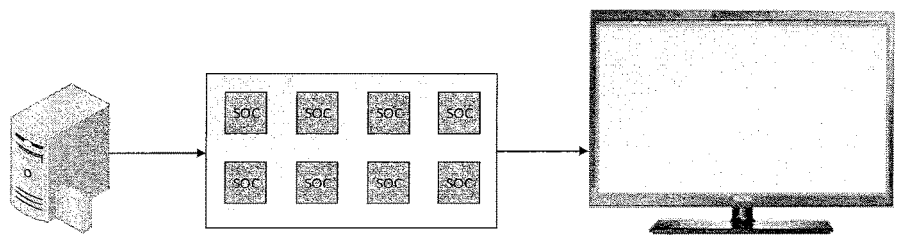
FIG. 17 is a schematic view showing implementation of a display control system according to another embodiment of the disclosure.
Figure 18:
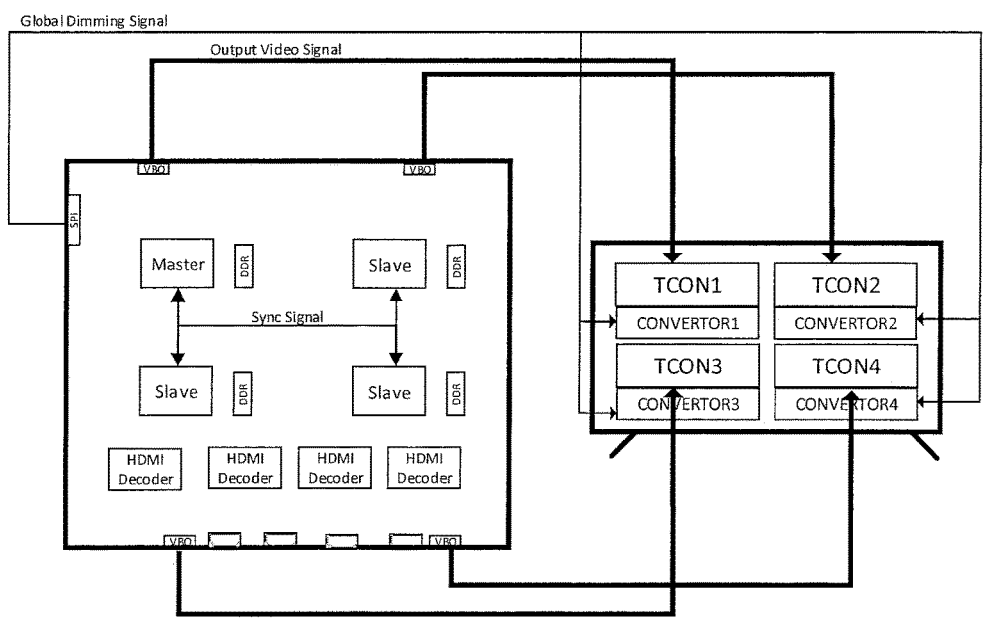
FIG. 18 is a schematic view showing implementation of a display control system according to yet another embodiment of the disclosure.

FIG. 17 and FIG. 18 illustrate example configurations of the display control system. In FIGS. 17 and 18, the processing unit, which is corresponding to each display region, in the display control device 200, may be implemented by a SOC chip, the display screen may include or be divided into 4 display regions TCON1~TCON4, the output device for outputting display data may be in a conventional configuration.

With the method for display control, the display control device and the display control system as depicted in the embodiments of the disclosure, the display screen is divided into a plurality of display regions, and then the display control on respective images of the display regions may be implemented respectively. Since after the dividing, respective display data of each of the display regions may be relatively less as compared with display data of the entire display screen, then there may be a relative small volume of data to be processed during the display control for each of the display regions; as such, when implementing the display control for each of the display regions, a chip which is relatively low in cost may be adopted. However, in the prior arts, when implementing the display control for the display screen, the display control is implemented for the whole display screen, resulting in a relatively large volume of data to be processed for the whole display screen, which may only be implemented by FPGA chip(s) of relative expensive cost, and thus is disadvantageous to mass production of the display screen. In contrast, in embodiments of the disclosure, a plurality of chips, each of which is low in cost, may be applied in combination with one another so as to implement the display control on an ultra-high definition display system, resulting in a decrease cost and in turn facilitating mass production. Furthermore, the method for display control as provided by the embodiment may meet requirements of display control for a display screen of an even higher resolution by increasing divided display regions and chips.

The above embodiments are only intended to illustrate, rather than being limitative to, technique solutions of the disclosure. Although of the present disclosure have been described with reference to the above exemplary embodiments, it would be appreciated by those skilled in the art that various changes or modifications to technique solutions described in these embodiments may be made, or equivalent replacement may be made to some features in these embodiments, without departing from the principles and spirit of technique solutions in the embodiments of the disclosure.

What is claimed is:

1. A method for controlling display of a single integral display screen, comprising steps of:

dividing a single integral display screen into display regions which are arranged into an M×N array, where M is an integer larger than 1 and N is an integer larger than 1; and controlling respective display regions to display corresponding images, such that the images displayed by all the display regions are allowed to be spliced together to present a picture to be displayed by the display screen, the step of controlling respective display regions to display corresponding images further comprises sub-steps of:

defining every four display regions which are adjacent to one another laterally and vertically within the display screen as a display group, the four display regions of each display group including a primary display region, a first secondary display region, a second secondary display region and a third secondary display region of the display group being sequentially arranged depending on a sequence of data scanning;

providing processing units each corresponding to one of the M×N display regions, each of the processing units storing therein scanning data for a corresponding display region, one of the processing units in each display group which is provided corresponding to the primary display region of the display group being a primary processing unit for the display group, while other ones of the processing units in the display group which are provided corresponding to the secondary display regions of the display group being secondary processing units for the display group;

controlling the respective processing units to operate, such that the respective processing units acquire sequentially the primary display data of corresponding display regions while the data scanning is performed in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group;

controlling each of the processing units to acquire the current resultant display data of the corresponding display region by using a preset filtering algorithm and a preset image processing algorithm which are stored in the processing unit, depending on the primary display data of the corresponding display region which are currently acquired already, and on the edge interaction data which are sent from corresponding secondary processing units for a specific display group and are currently received already when the processing unit itself functions as a primary processing unit corresponding to the specific display group; and determining whether or not a preset synchronous output condition is met, and if yes, controlling the respective processing units to synchronously control, according to the current resultant display data of the corresponding display regions which have been acquired, the corresponding display regions to display the corresponding images, such that the images displayed by all of the display regions are allowed to be spliced together to present the picture to be displayed by the display screen.

2. The method according to claim 1, wherein each of the display regions is controlled by one of the processing units to display the image.

3. The method according to claim 2, wherein each of the display regions comprises an edge region which is required to perform edge information interaction with a display region adjacent thereto, with scanning data for each of the display regions being stored in a processing unit corresponding to the display region; and wherein for each of the display regions, the step of controlling respective display regions to display corresponding images comprises:
obtaining primary display data of the display region from the processing unit corresponding to the display region, the primary display data comprising portions of the scanning data of the display region except display data of the edge region;
receiving edge interaction data from the processing unit corresponding to the adjacent display region; and
performing data processing on both the primary display data and the edge interaction data so as to obtain current resultant display data of the display region.

4. The method according to claim 2, wherein one of the processing units is implemented by a SOC/FPGA board or chip.

5. The method according to claim 1, wherein each of the display regions of the display screen comprises pixels which are arranged in an in a n1×m1 array, where n1 is an integer larger than 2 and m1 is an integer larger than 2, the primary display data of the primary display region of each display group includes display data from the $a^{th}$ row, the $b^{th}$ column to the $n1^{th}$ row, the $m1^{th}$ column, where a is equal to n/2 while b is equal to m/2, n and m represent the number of rows and the number of columns respectively, of a filter kernel, which is used in the preset filtering algorithm stored in each of the processing units, and n is less than n1 while m is less than m1;

wherein a first processing unit, a second processing unit and a third processing unit of each display group send first edge interaction data, second edge interaction data and third edge interaction data to the primary processing unit corresponding to the display group, respectively;

wherein the first edge interaction data are display data from the first row, the first column to the $n1^{th}$ row, the $2b^{th}$ column of the first secondary display region of each display region, the second edge interaction data are display data from the first row, the first column to the $2a^{th}$ row, the $m1^{th}$ column of the second secondary display region of each display region, and the third interaction edge data are display data from the first row, the first column to the $2a^{th}$ row, the $2b^{th}$ column of the third secondary display region of each display region, and wherein entire resultant display data of each display region comprise display data in a n1×m1 array.

6. The method according to claim 5, wherein the sub-step S24 comprises:

controlling each of the processing units to acquire current edge display data when the processing unit itself functions as a primary processing unit by the preset filtering algorithm, according to the edge interaction data which are sent from corresponding secondary processing units for a specific display group and are currently received already when the processing unit itself functions as a primary processing unit corresponding to the specific display group, and according to the primary display data of the corresponding display region which are currently acquired already; and controlling each of the processing units to acquire the current resultant display data of the corresponding display region by the preset image processing algorithm, according to the current edge display data of the processing unit when the processing unit itself functions as a primary processing unit and according to the primary display data of the corresponding display region which are currently acquired already.

7. The method according to claim 6, wherein the edge display data of the primary processing unit corresponding to each display group comprise first edge display data, second edge display data, and third edge display data;

the first edge display data are edge display data which are positioned from the $a^{th}$ row, the first column to the $n1^{th}$ row, the $b^{th}$ column of the first secondary display region and are acquired by the primary processing unit corresponding to each display group by using the preset filtering algorithm;

the second edge display data are edge display data which are positioned from the first row, the $b^{th}$ column to the $a^{th}$ row, the $m1^{th}$ column of the second secondary display region and are acquired by the primary processing unit corresponding to each display group by using the preset filtering algorithm; and the third edge display data are edge display data which are positioned from the first row, the first column to the $a^{th}$ row, the $b^{th}$ column of the third secondary display region and are acquired by the primary processing unit corresponding to each display group by using the preset filtering algorithm.

8. The method according to claim 1, wherein the determining whether or not a preset synchronous output condition is met comprises:

determining whether or not resultant display data of a first preset number of rows are acquired by the primary processing unit corresponding to each display group, and if yes, controlling the primary processing unit corresponding to the display group to send a synchronization request towards the secondary processing units corresponding to the display group, respectively; and determining whether or not synchronization responses sent by all of the secondary processing units corresponding to the display group are received by the primary processing unit corresponding to the display group, and if yes, determining that the preset synchronous output condition is met;

wherein the synchronization response is sent by the secondary processing unit corresponding to the display group after the secondary processing unit corresponding to the display group has received the synchronization request sent by the primary processing unit corresponding to the display group and it is determined that the resultant display data of the first preset number of rows of the secondary processing unit have been saved by the secondary processing unit itself.

9. A display control device for a single integral display screen, comprising:

a division unit configured to divide a single integral display screen into non-spliced display regions which are arranged into an M×N array, where M is an integer larger than 1 and N is an integer larger than 1; and a control unit configured to control respective display regions to display corresponding images, such that the images displayed by all the display regions are allowed to be spliced together to present a picture to be displayed by the display screen, the control unit comprises:

a definition module, which is configured to define every four display regions which are adjacent to one another laterally and vertically within the display screen as a display group, the four display regions of each display group including a primary display region, a first secondary display region, a second secondary display region and a third secondary display region of the display group being sequentially arranged depending on a sequence of data scanning;

a setting module, which is configured to provide processing units each corresponding to one of the M×N display regions, each of the processing units storing therein scanning data for a corresponding display region, one of the processing units in each display group which is provided corresponding to the primary display region of the display group being a primary processing unit for the display group, while other ones of the processing units in the display group which are provided corresponding to the secondary display regions of the display group being secondary processing units for the display group;

a control module, which is configured to:

control the respective processing units to operate, such that the respective processing units acquire sequentially the primary display data of corresponding display regions while the data scanning is performed in the corresponding display regions, and such that each of the processing units, when functioning as a corresponding secondary processing unit of a certain display group depending on a position where the data scanning is performed in the display region corresponding to the processing unit, sends edge interaction data, which are scheduled to be delivered to a corresponding primary processing unit for the certain display group, to the corresponding primary processing unit, and receive, when functioning as a primary processing unit corresponding to a specific display group, edge interaction data which are sent sequentially from corresponding secondary processing units for the specific display group; and control each of the processing units to acquire the current resultant display data of the corresponding display region by using a preset filtering algorithm and a preset image processing algorithm which are stored in the processing unit, depending on the primary display data of the corresponding display region which are currently acquired already, and on the edge interaction data which are sent from corresponding secondary processing units for a specific display group and are currently received already when the processing unit itself functions as a primary processing unit corresponding to the specific display group; and a determination module, which is configured to determine whether or not a preset synchronous output condition is met, and if yes, to send a trigger signal to the control module; and the control module is further configured to control the respective processing units to synchronously control, according to the current resultant display data of the corresponding display regions which have been acquired, the corresponding display regions to display the corresponding images, such that the images displayed by all of the display regions are allowed to be spliced together to present the picture to be displayed by the display screen.

10. The display control device according to claim 9, wherein each of the processing units is configured to control one of the display regions to display the image.

11. The display control device according to claim 10, wherein each of the display regions comprises an edge region which is required to perform edge information interaction with a display region adjacent thereto, with scanning data for each of the display regions being stored in a processing unit corresponding to the display region; and the control unit is configured to:

obtain primary display data of the display region from the processing unit corresponding to the display region, the primary display data comprising portions of the scanning data of the display region except display data of the edge region;

receive edge interaction data from the processing unit corresponding to the adjacent display region; and perform data processing on both the primary display data and the edge interaction data so as to obtain current resultant display data of the display region.

12. The display control device according to claim 10, wherein each of the processing units comprises a SOC/FPGA board or chip.

13. The display control device according to claim 9, wherein each of the display regions of the display screen comprises pixels which are arranged in an in a n1×m1 array, where n1 is an integer larger than 2 and m1 is an integer larger than 2, the primary display data of the primary display region of each display group includes display data from the $a^{th}$ row, the $b^{th}$ column to the $n1^{th}$ row, the $m1^{th}$ column m1, where a is equal to n/2 while b is equal to m/2, n and m represent the number of rows and the number of columns respectively, of a filter kernel, which is used in the preset filtering algorithm stored in each of the processing units, and n is less than n1 while m is less than m1;

wherein a first processing unit, a second processing unit and a third processing unit of each display group send first edge interaction data, second edge interaction data and third edge interaction data to the primary processing unit corresponding to the display group, respectively;

wherein the first edge interaction data are display data from the first row, the first column to the $n1^{th}$ row, the $2b^{th}$ column of the first secondary display region of each display region, the second edge interaction data are display data from the first row, the first column to the $2a^{th}$ row, the $m1^{th}$ column of the second secondary display region of each display region, and the third edge interaction data are display data from the first row, the first column to the $2a^{th}$ row, the $2b^{th}$ column of the third secondary display region of each display region, and wherein entire resultant display data of each display region comprise display data in a n1×m1 array.

14. The display control device according to claim 13, wherein the control module is further configured to:

control each of the processing units to acquire current edge display data when the processing unit itself functions as a primary processing unit by the preset filtering algorithm, according to the edge interaction data which are sent from corresponding secondary processing units for a specific display group and are currently received already when the processing unit itself functions as a primary processing unit corresponding to the specific display group, and according to the primary display data of the corresponding display region which are currently acquired already; and control each of the processing units to acquire the current resultant display data of the corresponding display region by the preset image processing algorithm, according to the current edge display data of the processing unit when the processing unit itself functions as a primary processing unit and according to the primary display data of the corresponding display region which are currently acquired already.

15. The display control device according to claim 14, wherein the edge display data of the primary processing unit corresponding to each display group comprise first edge display data, second edge display data, and third edge display data;

the first edge display data are edge display data which are positioned from the $a^{th}$ row, the first column to the $n1^{th}$ row, the $b^{th}$ column of the first secondary display region and are acquired by the primary processing unit corresponding to each display group by using the preset filtering algorithm;

the second edge display data are edge display data which are positioned from the first row, the $b^{th}$ column to the $a^{th}$ row, the $m1^{th}$ column of the second secondary display region and are acquired by the primary processing unit corresponding to each display group by using the preset filtering algorithm; and the third edge display data are edge display data which are positioned from the first row, the first column to the $a^{th}$ row, the $b^{th}$ column of the third secondary display region and are acquired by the primary processing unit corresponding to each display group by using the preset filtering algorithm.

16. The display control device according to claim 9, wherein the determination module is further configured to:

determine whether or not resultant display data of a first preset number of rows are acquired by the primary processing unit corresponding to each display group, and if yes, control the primary processing unit corresponding to the display group to send a synchronization request towards the secondary processing units corresponding to the display group, respectively; and determine whether or not synchronization responses sent by all of the secondary processing units corresponding to the display group are received by the primary processing unit corresponding to the display group, and if yes, determine that the preset synchronous output condition is met;

wherein the synchronization response is sent by the secondary processing unit corresponding to the display group after the secondary processing unit corresponding to the display group has received the synchronization request sent by the primary processing unit corresponding to the display group and it is determined that the resultant display data of the first preset number of rows of the secondary processing unit have been saved by the secondary processing unit itself.

17. A display control system, comprising:

a display screen, an output device for outputting display data, and the display control device according to claim 9, wherein the output device, the display control device and the display screen are connected with one another sequentially.

* * * * *